(12) United States Patent
Luo et al.

(10) Patent No.: US 11,601,200 B2
(45) Date of Patent: Mar. 7, 2023

(54) MULTI-CHANNEL WDM LIGHT EMITTING DEVICE AND OPTICAL TRANSCEIVER HAVING THE SAME

(71) Applicant: Global Technology Inc., Ningbo (CN)

(72) Inventors: Jian-Hong Luo, Ningbo (CN); Lai-Wei Lu, Ningbo (CN); Rui Huang, Ningbo (CN); Yanrong Pan, Ningbo (CN)

(73) Assignee: Global Technology Inc., Ningbo (CN)

( * ) Notice: Subject to any disclaimer, the term of this patent is extended or adjusted under 35 U.S.C. 154(b) by 0 days.

(21) Appl. No.: 17/495,920

(22) Filed: Oct. 7, 2021

(65) Prior Publication Data

US 2023/0010830 A1    Jan. 12, 2023

(30) Foreign Application Priority Data

Jul. 12, 2021 (CN) .......................... 202110784117.3

(51) Int. Cl.
*H04J 14/02* (2006.01)
*H04B 10/40* (2013.01)

(52) U.S. Cl.
CPC .............. *H04B 10/40* (2013.01); *H04J 14/02* (2013.01)

(58) Field of Classification Search
CPC ........ H04B 10/40; H04B 10/50; H04B 10/60; H04J 14/02; H04J 14/00; G02B 6/12007
USPC .................................... 398/79, 84, 85, 86, 87
See application file for complete search history.

(56) References Cited

U.S. PATENT DOCUMENTS

| | | | |
|---|---|---|---|
| 2005/0063423 A1* | 3/2005 | Minakawa | G02B 27/145 370/534 |
| 2019/0018206 A1* | 1/2019 | Luo | G02B 6/43 |
| 2020/0043522 A1* | 2/2020 | Damaghi | G02B 5/09 |
| 2020/0073052 A1* | 3/2020 | Lin | G02B 6/4254 |

* cited by examiner

*Primary Examiner* — Hibret A Woldekidan
(74) *Attorney, Agent, or Firm* — Grossman Tucker Perreault & Pfleger, PLLC; Norman S. Kinsella

(57) ABSTRACT

A multi-channel wavelength division multiplexing light emitting device includes a casing and an optical communication assembly accommodated in the casing. The optical communication assembly includes a substrate, a plurality of first light emitting units disposed on the substrate, a plurality of second light emitting units disposed on the substrate, a first wavelength division multiplexer, and a second wavelength division multiplexer. The first light emitting units are arranged to correspond with the first wavelength division multiplexer. The second light emitting units are arranged to correspond with the second wavelength division multiplexer.

13 Claims, 5 Drawing Sheets

MULTI-CHANNEL WDM LIGHT EMITTING DEVICE AND OPTICAL TRANSCEIVER HAVING THE SAME

CROSS-REFERENCE TO RELATED APPLICATIONS

This non-provisional application claims priority under 35 U.S.C. § 119(a) on Patent Application No(s). 202110784117.3 filed in China on Jul. 12, 2021, the entire contents of which are hereby incorporated by reference.

BACKGROUND

1. Technical Field

The present disclosure relates to optical communication, more particularly, to a multi-channel wavelength division multiplexing (WDM) light emitting device and an optical transceiver having the same.

2. Related Art

Optical transceivers are generally installed in electronic communication facilities in modern high-speed communication networks. In order to make flexible the design of an electronic communication facility and less burdensome the maintenance of the same, an optical transceiver is inserted into a corresponding cage that is disposed in the communication facility in a pluggable manner. In order to define the electrical-to-mechanical interface of the optical transceiver and the corresponding cage, different form factors such as XFP (10 Gigabit Small Form Factor Pluggable) used in 10 GB/s communication rate, QSFP (Quad Small Form-factor Pluggable), or others at different communication rates have been made available.

With the development of communication system and the rapid growth of communication bandwidth demand for various network services, the conventional communication system faces two challenges: high density and low power consumption. As to the challenges, the optical communication module in the communication system is required to provide larger bandwidth and faster transmission rate with small size and low power consumption. Because the shape and size of optical communication module have been defined by a standard specification in the multi-source agreement (MSA), the sizes of the circuit board and the photoelectric component inside the module are also restricted.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
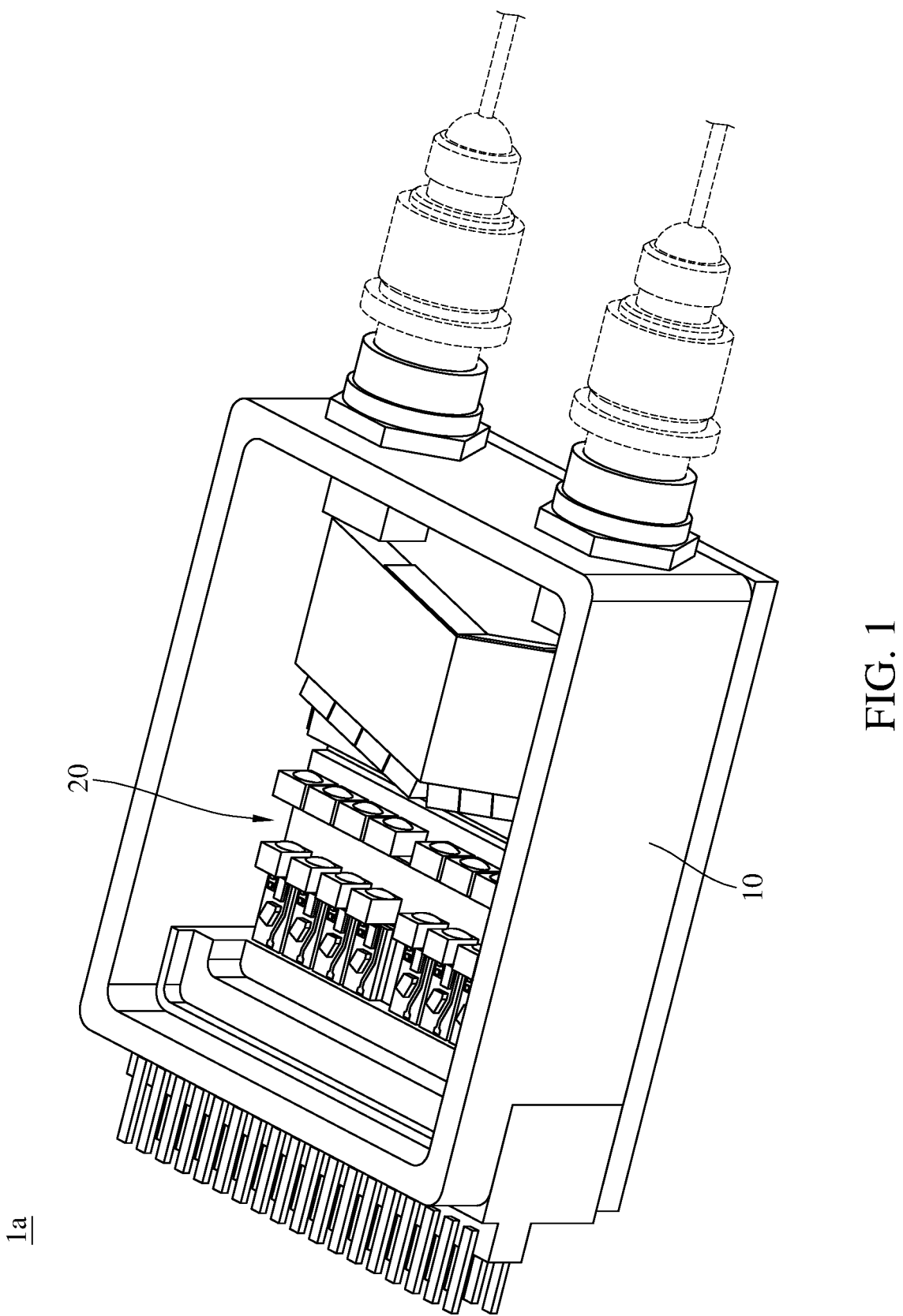
FIG. 1 is a perspective view of a multi-channel WDM light emitting device according to an embodiment of the present disclosure.
Figure 2:
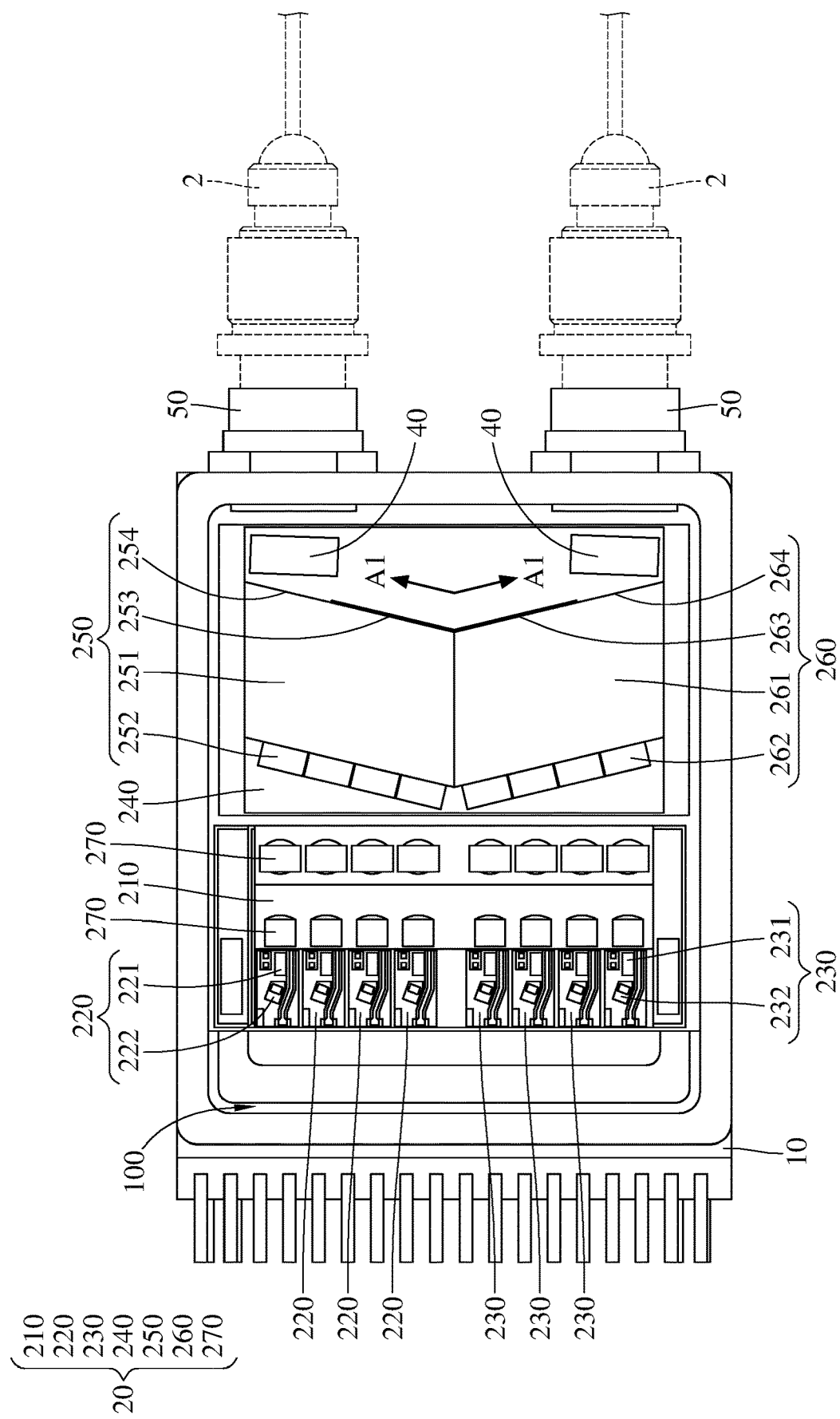
FIG. 2 is a top view of the multi-channel WDM light emitting device in FIG. 1.

Please refer to FIG. 1 and FIG. 2. FIG. 1 is a perspective view of a multi-channel WDM light emitting device according to an embodiment of the present disclosure, and FIG. 2 is a top view of the multi-channel WDM light emitting device in FIG. 1. In this embodiment, a multi-channel WDM light emitting device 1a includes a casing 10 and an optical communication assembly 20. The casing 10 is, for example but not limited to, a metal shell for packaging. For the purpose of illustration, a top portion of the casing 10 is omitted in FIG. 1 and FIG. 2 to show the optical communication assembly 20 disposed inside the casing 10.

The optical communication assembly 20 is accommodated in a space 100 of the casing 10, and the optical communication assembly 20 includes a substrate 210, a plurality of first light emitting units 220, a plurality of second light emitting units 230, a carrier 240, a first wavelength division multiplexer 250 and a second wavelength division multiplexer 260. Please further refer to FIG. 3 which shows a side view from the interior of the multi-channel WDM light emitting device in FIG. 1. The substrate 210 is, for example but not limited to, a base configured for supporting optical components. The first light emitting unit 220 and the second light emitting unit 230 are disposed on a top surface 211 of the substrate 210. Each of the first light emitting units 220 includes active components 221 and 222, and each of the second light emitting units 230 includes active components 231 and 232. Each of the active components 221 and 231 may be a light emitting diode, a transmitter optical subassembly (TOSA) or their package. Each of the active components 222 and 232 may be a backlight receiving photodiode. The active components 222 and 232 are electrically connected to the active components 221 and 231, respectively, so as to monitor the light intensity and working state of the active components 221 and 231. In this embodiment, both the first light emitting unit 220 and the second light emitting unit 230 have light emitting diodes (active components 221, 231) and backlight receiving photodiodes (active components 222, 232), and these two types of active components work with each other to constitute an active component set. In some other embodiments, each of the first light emitting unit 220 and the second light emitting unit 230 may only include light emitting diode.

The carrier 240 is, for example but not limited to, a silicon base disposed on a bottom inner surface 110 of the casing 10. The first wavelength division multiplexer 250 and the second wavelength division multiplexer 260 are disposed on the carrier 240. In this embodiment, the optical communication assembly 20 includes the carrier 240, but the present disclosure is not limited thereto. In some other embodiments, the optical communication assembly is provided without any carrier, and the wavelength division multiplexer is disposed on the bottom inner surface of the casing.

The first wavelength division multiplexer 250 includes an optical waveguide body 251, a bandpass filter set 252, a total reflection unit 253 and an anti-reflective coating 254. The second wavelength division multiplexer 260 includes an optical waveguide body 261, bandpass filter set 262, a total reflection unit 263 and an anti-reflective coating 264. The optical waveguide bodies 251 and 261 are both in a shape of parallelogram or rhombus with a cross-sectional size satisfying the condition of single mode transmission. The optical waveguide bodies 251 and 261 can be made of any waveguide material used in a conventional fabrication process, such as silicon dioxide, composite material containing a stack of silicon and germanium layers, or composite material containing a stack of silicon and silicon dioxide layers. The bandpass filter sets 252 and 262 are disposed at light entering sides of the optical waveguide bodies 251 and 261, respectively (such as left sides of the optical waveguide bodies 251 and 261 in FIG. 2). Each of the bandpass filter sets 252 and 262 includes filters having different bands of frequency corresponding with operating wavelengths of respective active components 221 and 231 (channels). The bandpass filter sets 252 and 262 can allow frequencies in a specified band of frequency corresponding with the operating wavelength to pass through, but block frequencies outside of the operating wavelength. As to each of the bandpass filter sets 252 and 262, the filters may be one-piece formed as a single component or independently arranged to form an array of filters. The total reflection units 253 and 263 are disposed at light exiting sides of the optical waveguide bodies 251 and 261, respectively (such as right sides of the optical waveguide bodies 251 and 261 in FIG. 2). In this embodiment, the total reflection units 253 and 263 may be a coating or a mirror which can reflect light within all wavelengths. The anti-reflective coatings 254 and 264 are disposed at light exiting sides of the optical waveguide bodies 251 and 261, respectively, and the total reflection units 253 and 263 do not cover respective anti-reflective coatings 254 and 264. In other words, the anti-reflective coatings 254 and 264 are located in regions at light exiting sides of respective optical waveguide bodies 251 and 261 where the anti-reflective coatings 254 and 264 do not exist. The anti-reflective coatings 254 and 264 are optional components. In some other embodiments, if there is no serious refraction or total reflection at the interface between the optical waveguide body and air, anti-reflective coating is not necessarily required.

In this embodiment, the first wavelength division multiplexer 250 and the second wavelength division multiplexer 260 of the optical communication assembly 20 are two independent wavelength division multiplexers. As shown in FIG. 2, the first wavelength division multiplexer 250 and the second wavelength division multiplexer 260 are adjacently arranged, even attached to each other, such that the first wavelength division multiplexer 250 and the second wavelength division multiplexer 260 jointly form a V-shaped wavelength division multiplexing assembly, with the V-shaped notch away from the first light emitting units 220 and the second light emitting units 230. The V-shape may be defined by the intersection of two reference arrows Al in FIG. 2.

Figure 3:
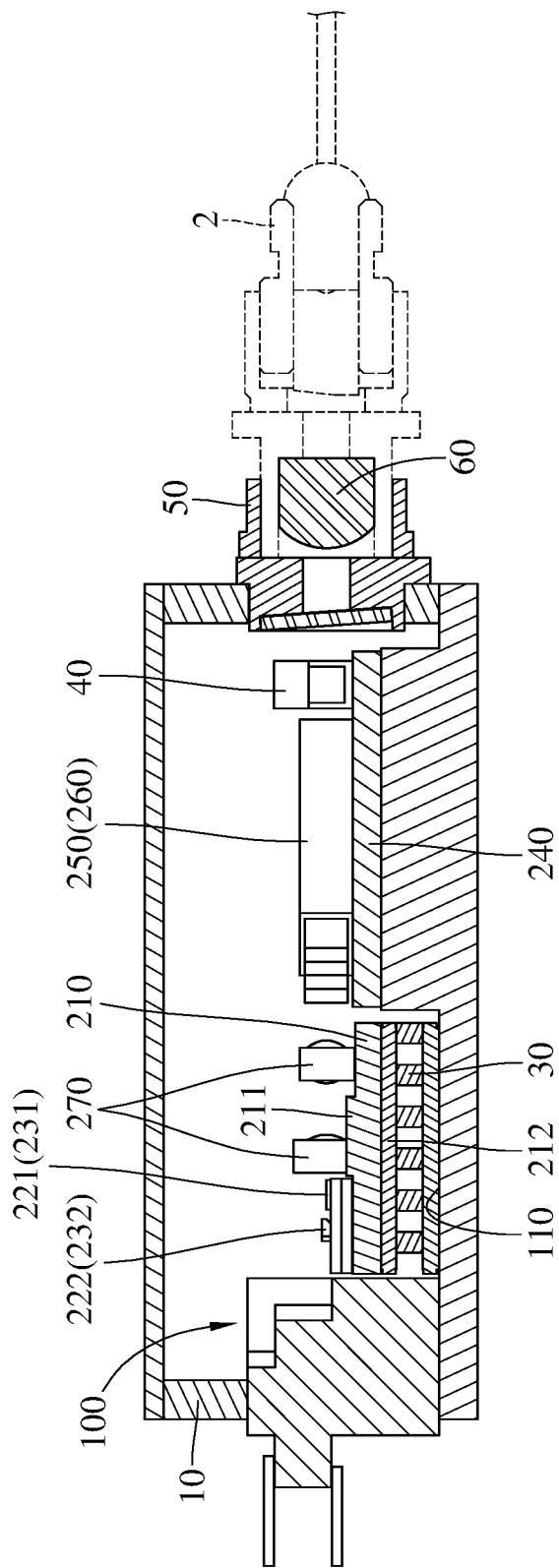
FIG. 3 is a side view from the interior of the multi-channel WDM light emitting device in FIG. 1.

Moreover, in this embodiment, the optical communication assembly 20 further includes a plurality of optical lenses 270 disposed on the substrate 210. In FIG. 2, the optical lenses 270 are arranged in two rows of optical lens array, and the number of lenses in each row corresponds with a total number of the active components 221 and 231. In this embodiment, a total number of the first light emitting units 220 and the second light emitting units 230 is greater than four. As shown in FIG. 2 and FIG. 3, the number of the first light emitting units 220 is four, the number of the second light emitting units 230 is also four, and thus an eight channels WDM light emitting device 1a is provided. In some other embodiments, either the number of the first light emitting units 220 or that of the second light emitting units 230 is more than four, such that the multi-channel WDM light emitting device 1a has a total of more than eight channels. In another implementation, both numbers of the first light emitting units 220 and the second light emitting units 230 are large than four.

In this embodiment, the multi-channel WDM light emitting device 1a further includes a temperature controller 30. The temperature controller 30 is, for example but not limited to, a thermocouple temperature controller accommodated in the space 100 of the casing 10, and the temperature controller 30 is in thermal contact with the substrate 210 of the optical communication assembly 20. More specifically, the temperature controller 30 is disposed between a bottom surface 212 of the substrate 210 and the bottom inner surface 110 of the casing 10, and opposite sides of the temperature controller 30 are in thermal contact with the bottom surface 212 of the substrate 210 and the bottom inner surface 110 of the casing 10, respectively. In short, the optical communication assembly 20 and the temperature controller 30 are disposed on opposite surfaces (top and bottom surfaces) of the substrate 210, respectively. The temperature controller 30 can help maintain the temperature inside the casing 10 within a desired temperature range suitable for operation.

Moreover, in this embodiment, the space 100 inside the casing 10 is an airtight cavity with respect to the external environment around the casing 10, such that air and water (along with other foreign objects) in the external environment cannot enter into the casing 10. Thus, an interference in performance of the active components 221, 231 and the temperature controller 30 inside the airtight cavity (space 100) by dust or water vapor can be prevented. In some embodiments, a window can be formed on the casing 10, a glass cover can be disposed at the window, and the glass cover is welded with the casing 10 to seal the window to ensure the airtightness of the casing 10. Light generated by the optical communication assembly 20 can travel from the interior of the casing 10 to the exterior of the casing 10.

In this embodiment, the multi-channel WDM light emitting device 1a further includes two optical isolators 40 accommodated in the space 100 of the casing 10, and the two optical isolators 40 are arranged to respectively correspond with the first wavelength division multiplexer 250 and the second wavelength division multiplexer 260. The optical isolator 40 can restrict light emitted by the light emitting diode to travel along a particular direction. Light passing through the light exiting sides of the first wavelength division multiplexer 250 and the second wavelength division multiplexer 260 can be restricted to be along a particular direction by the optical isolators 40.

In this embodiment, the multi-channel WDM light emitting device 1a further includes two welding rings 50 disposed on the casing 10, and the welding rings 50 are arranged to respectively correspond with the first wavelength division multiplexer 250 and the second wavelength division multiplexer 260. As shown in FIG. 2 and FIG. 3, each of the welding rings 50 is exposed to outside. An optical fiber adaptor 2 is inserted into the welding ring 50 and fixed with the welding ring 50 by laser beam welding so as to couple the optical fiber adaptor 2 with the optical communication assembly 20 as well as ensure the space 100 of the casing 10 to be airtight. Moreover, in order to enhance the coupling efficiency between the optical fiber adaptor 2 and the optical communication assembly 20, the multi-channel WDM light emitting device 1a further includes two optical lenses 60 respectively accommodated in the two welding rings 50.

Figure 4:
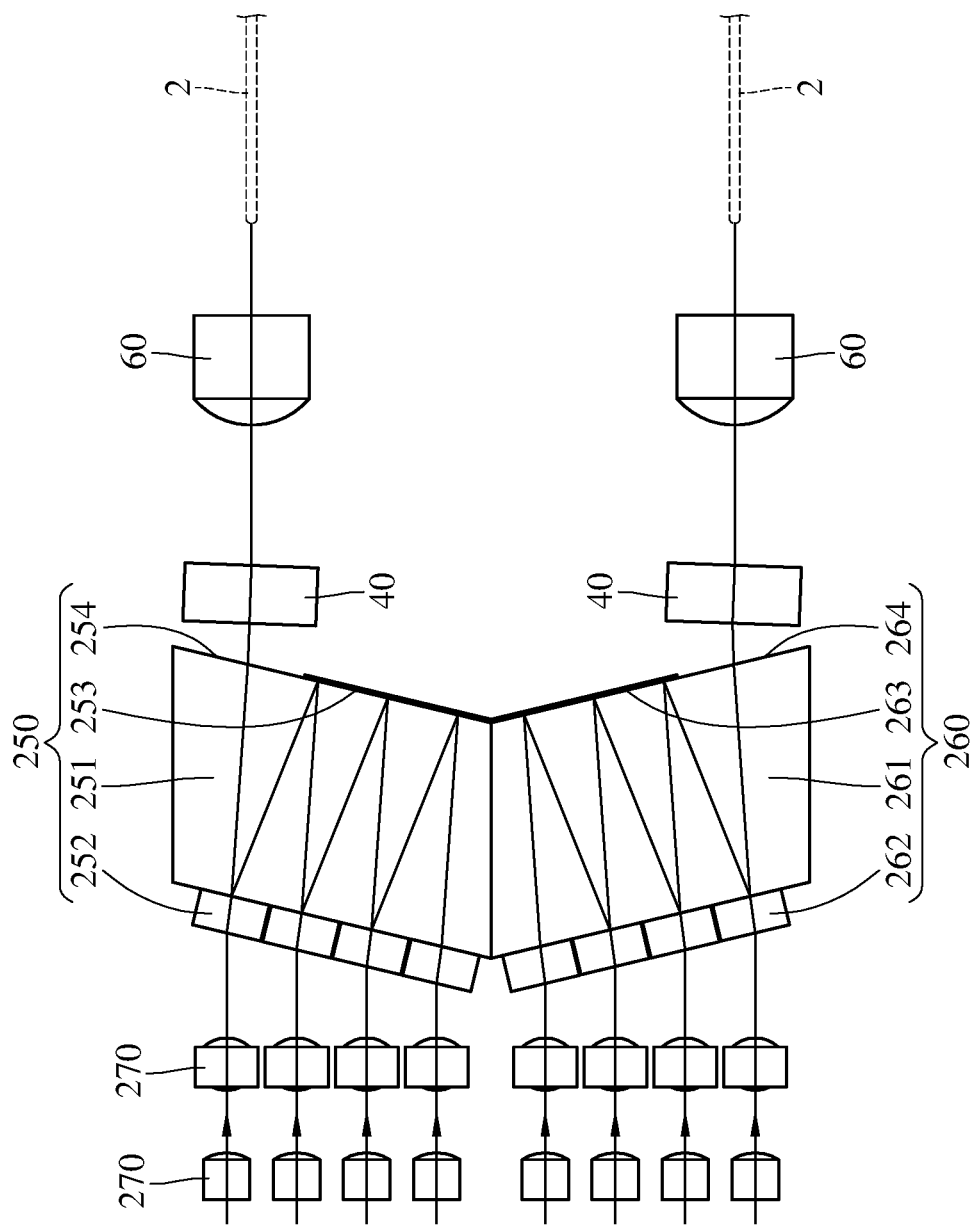
FIG. 4 is a schematic view of an optical path of the multi-channel WDM light emitting device in FIG. 2.

FIG. 4 is a schematic view of an optical path of the multi-channel WDM light emitting device in FIG. 2. Referring to FIG. 3 and FIG. 4, light generated by the first light emitting units 220 and the second light emitting units 230 passes through the optical lenses (not numbered, and they may be disposed in grooves formed on the substrate 210) in the casing 10 to obtain multiple collimated beams, which can be eight light beams (channels) divided into two groups. Each four-light beam group could enter into the first wavelength division multiplexer 250 and/or the second wavelength division multiplexer 260. As to the first wavelength division multiplexer 250, the four light beams passing the bandpass filter set 252 and entering into the optical waveguide body 251 propagates along a waveguide optical path in Z-shape or W-shape due to the reflection by the total reflection unit 253 so as to perform the next waveguide propagation. Since the four light beams are restricted to travel along a specific direction by the optical waveguide, the four light beams will finally exit the waveguide body through the anti-reflective film 254, and then through the optical isolator 40 to couple with the optical fiber adapter 2. Similarly, as to the second wavelength division multiplexer 260, the other four light beams passing the bandpass filter set 262 and entering into the optical waveguide body 261 propagates along a waveguide optical path in Z-shape or W-shape due to the reflection by the total reflection unit 263 so as to perform the next waveguide propagation. Since the four light beams are restricted to travel along a specific direction by the optical waveguide, the four light beams will finally exit the waveguide body through the anti-reflective film 264, and then through the optical isolator 40 to couple with the optical fiber adapter 2. The waveguide optical path may be linearly distributed in Z-shape or W-shape, or curly distributed in Z-shape or W-shape.

Figure 5:
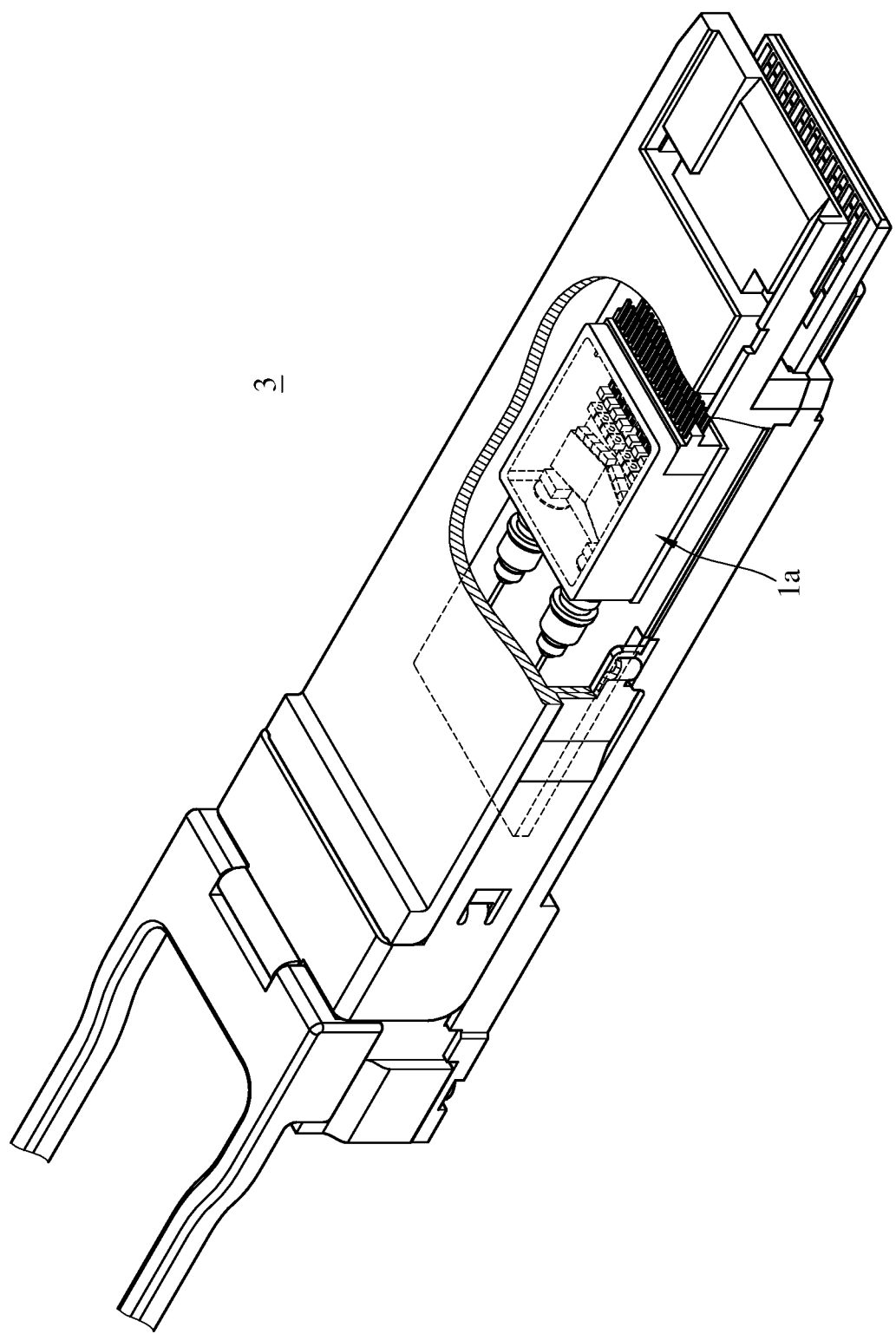
FIG. 5 is a perspective view of an optical transceiver according to an embodiment of the present disclosure.

FIG. 5 is a perspective view of an optical transceiver according to an embodiment of the present disclosure. In this embodiment, an optical transceiver 3 includes a housing and one or more optical communication components inside the housing. The one or more optical communication components inside the housing of the optical transceiver 3 may include the aforementioned multi-channel WDM light emitting device. FIG. 5 shows that the optical transceiver 3 includes the multi-channel WDM light emitting device 1a. It is noted that the multi-channel WDM light emitting device inside the optical transceiver of the present disclosure is not limited by the multi-channel WDM light emitting device 1a.

According to the present disclosure, the multi-channel WDM light emitting device includes two wavelength division multiplexers. The light beams in multiple channels can be divided into two groups passing through respective wavelength division multiplexers. Take an eight-channel WDM as an example. During the WDM operation, the optical distance in an eight-channel device where the configuration of two wavelength division multiplexers is applied is equal to the optical distance in a four-channel device. Therefore, it is helpful to prevent overly long optical distance in a multi-channel optical communication module with large number of channels during the WDM operation, and effectively maintain or even improve the optical coupling efficiency.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A multi-channel wavelength division multiplexing (WDM) light emitting device, comprising:
   a casing; and
   an optical communication assembly accommodated in the casing, the optical communication assembly comprising:
   a substrate;
   a plurality of first light emitting units disposed on the substrate;
   a plurality of second light emitting units disposed on the substrate;
   a first wavelength division multiplexer, wherein the plurality of first light emitting units are arranged to correspond with the first wavelength division multiplexer; and
   a second wavelength division multiplexer, wherein the plurality of second light emitting units are arranged to correspond with the second wavelength division multiplexer;
   wherein the first wavelength division multiplexer and the second wavelength division multiplexer jointly form a V-shaped wavelength division multiplexing assembly, with a V-shaped notch away from the first and second light emitting units.

2. The multi-channel WDM light emitting device according to claim 1, wherein the first wavelength division multiplexer and the second wavelength division multiplexer are two independent wavelength division multiplexers.

3. The multi-channel WDM light emitting device according to claim 1, wherein a number of the plurality of first light emitting units is greater than four, and a number of the plurality of second light emitting units is greater than four.

4. The multi-channel WDM light emitting device according to claim 1, wherein the optical communication assembly is accommodated in an airtight cavity of the casing.

5. The multi-channel WDM light emitting device according to claim 4, further comprising a temperature controller accommodated in the airtight cavity, wherein the temperature controller is in thermal contact with a bottom surface of the substrate and the casing.

6. The multi-channel WDM light emitting device according to claim 1, further comprising two optical isolators accommodated in the casing, wherein the two optical isolators are arranged to correspond with the first wavelength division multiplexer and the second wavelength division multiplexer, respectively.

7. The multi-channel WDM light emitting device according to claim 1, wherein each of the plurality of first light emitting units includes an active component, and each of the plurality of second light emitting units includes an active component, and each of the active components includes a light emitting diode or a set containing light emitting diode and backlight receiving photodiode.

8. The multi-channel WDM light emitting device according to claim 1, further comprising two welding rings disposed on the casing, wherein the two welding rings are arranged to correspond with the first wavelength division multiplexer and the second wavelength division multiplexer, respectively.

9. The multi-channel WDM light emitting device according to claim 8, further comprising two optical lenses accommodated in the two welding rings.

10. An optical transceiver, comprising the multi-channel WDM light emitting device according to claim 1.

11. The multi-channel WDM light emitting device according to claim 1, wherein the first wavelength division multiplexer comprises a first waveguide body, a first bandpass filter set, a first total reflection unit and a first anti-reflective coating; the first bandpass filter set is disposed on a first light incident surface of the first waveguide body, and the first anti-reflective coating is disposed on a first light exiting surface of the first waveguide body; the second wavelength division multiplexer comprises a second waveguide body, a second bandpass filter set, a second total reflection unit and a second anti-reflective coating; the second bandpass filter set is disposed on a second light incident surface of the second waveguide body, and the second anti-reflective coating is disposed on a first light exiting surface of the first waveguide body.

12. The multi-channel WDM light emitting device according to claim 11, wherein the first bandpass filter set and second bandpass filter set, respectively face the plurality of first light emitting units and the plurality of second light emitting units.

13. The multi-channel WDM light emitting device according to claim 11, the first and second waveguide bodies are both in a shape of parallelogram with a cross-sectional size satisfying the condition of single mode transmission.

* * * * *